United States Patent [19]

Nishimoto et al.

[11] Patent Number: 5,499,808
[45] Date of Patent: Mar. 19, 1996

[54] SHEET FEEDING APPARATUS

[75] Inventors: Yoshifumi Nishimoto; Kenichi Kataoka, both of Yokohama, Japan

[73] Assignee: Canon Kabushiki Kaisha, Tokyo, Japan

[21] Appl. No.: 337,194

[22] Filed: Nov. 7, 1994

Related U.S. Application Data

[60] Continuation of Ser. No. 19,694, Feb. 19, 1993, abandoned, which is a division of Ser. No. 811,911, Dec. 23, 1991, Pat. No. 5,244,202, which is a continuation of Ser. No. 541,399, Jun. 21, 1990, abandoned.

[30] Foreign Application Priority Data

Jun. 22, 1989 [JP] Japan ..................... 1-160107

[51] Int. Cl.$^6$ ..................... B65H 5/00
[52] U.S. Cl. ................ 271/267; 271/278; 310/323
[58] Field of Search ................ 271/18.1, 193, 271/251, 267, 268, 278, 266; 198/609, 630; 310/323

[56] References Cited

U.S. PATENT DOCUMENTS

| | | |
|---|---|---|
| 2,726,864 | 12/1955 | Waechter . |
| 2,729,136 | 1/1956 | Feick et al. . |
| 3,415,509 | 12/1968 | Tyburski et al. . |
| 3,516,656 | 6/1970 | Sherman . |
| 3,747,921 | 7/1973 | Knappe ..................... 271/267 |
| 4,334,759 | 6/1982 | Clausing . |
| 4,426,073 | 1/1984 | Mizuma . |
| 4,432,541 | 2/1984 | Clark et al. . |
| 4,580,073 | 4/1986 | Okumura et al. ..................... 310/323 |
| 4,672,256 | 6/1987 | Okuno et al. ..................... 310/323 |
| 4,955,598 | 9/1990 | Hiroshige et al. . |
| 5,062,622 | 11/1991 | Kataoka et al. ..................... 271/267 |
| 5,065,999 | 11/1991 | Kataoka et al. ..................... 271/267 |
| 5,094,444 | 3/1992 | Seki ..................... 271/267 |
| 5,149,080 | 9/1992 | Yamamoto ..................... 271/267 |
| 5,176,376 | 1/1993 | Igaki et al. ..................... 271/267 |
| 5,244,202 | 9/1993 | Nishimoto et al. ..................... 271/251 |

FOREIGN PATENT DOCUMENTS

| | | | |
|---|---|---|---|
| 404158 | 12/1990 | European Pat. Off. ..................... | 271/267 |
| 1186472 | 2/1965 | Germany . | |
| 59-177243 | 10/1984 | Japan ..................... | 271/264 |
| 61-2636 | 1/1986 | Japan . | |
| 61-86333 | 5/1986 | Japan . | |
| 62-285834 | 12/1987 | Japan . | |
| 63-112351 | 5/1988 | Japan . | |
| 6464569 | 3/1989 | Japan . | |
| 160532 | 3/1989 | Japan . | |
| 1122846 | 5/1989 | Japan . | |
| 209342 | 8/1990 | Japan ..................... | 271/267 |
| 209335 | 8/1990 | Japan ..................... | 271/267 |
| 23132 | 1/1991 | Japan ..................... | 271/264 |
| 36129 | 2/1991 | Japan ..................... | 271/267 |
| 26628 | 2/1991 | Japan ..................... | 271/267 |

Primary Examiner—H. Grant Skaggs
Attorney, Agent, or Firm—Fitzpatrick, Cella, Harper & Scinto

[57] ABSTRACT

A sheet feeding apparatus includes a vibration member having an upper surface, a bottom surface, an inner circumferential portion and an outer circumferential portion, and further having a first portion in press contact with the sheet being fed and a second portion substantially out of contact with the sheet while the sheet is being fed. An electromechanical energy conversion element is provided on the bottom surface of the vibration member and generates a vibration wave in the first portion of the vibration member in response to an applied electrical signal, the vibration wave creating a driving force for moving the sheet.

19 Claims, 3 Drawing Sheets

TRAVELLING VIBRATION WAVE

TRAVELLING VIBRATION WAVE

SHEET FEEDING APPARATUS

This application is a continuation of application Ser. No. 08/019,694 filed Feb. 19, 1993, now abandoned; which is of division of Ser. No. 07/811,911 filed Dec. 23, 1991, U.S. Pat. No. 5,244,202; which is a continuation of Ser. No. 07/541,399 filed Jun. 21, 1990, now abandoned.

BACKGROUND OF THE INVENTION

1. Field of the Invention

This invention relates to a sheet feeding apparatus provided in machines having a mechanism for feeding a sheet or the like, such as a computer, a copier, a facsimile, a word processor, a typewriter or the like, and more particularly, to a sheet feeding apparatus utilizing travelling vibration waves.

2. Description of the Related Art

Heretofore, this kind of apparatus was configured so as to produce travelling vibration waves in elastic members holding a sheet between them in order to feed the sheet, as disclosed in Japanese Patent Public Disclosure No. 59-177243 (1984).

The principle for feeding the sheet in the above-described disclosure will now been explained by reference to FIG. 3.

In FIG. 3, a sheet 13 is held between elastic members 11 and 12 with an appropriate pressure. A travelling flexural vibration (that is, a travelling vibration wave) is produced in each of the elastic members 11 and 12. Since it is arranged so that the spatial phase difference between the two travelling vibration waves is 180°, the flexural vibrations in the elastic members 11 and 12 travel so that convex portions relative to the sheet 13 of the respective waves always face each other. When a certain material particle, for example, in the convex portion on the surface of each of the elastic members 11 and 12 adjacent the sheet 13 is observed, the material particle performs a movement depicting, in general, an elliptic orbit. As for the elastic member 11, when the travelling vibration wave moves in the rightward direction, the material particle depicts a clockwise elliptic locus $P_1$, as shown in FIG. 3. Accordingly, the direction of movement of the material particle in the convex portion is reverse to the travelling direction of the vibration for both elastic members 11 and 12. Such movements function as forces to feed the sheet 13.

On the other hand, forces to feed the sheet in the same direction as the travelling direction of the wave are produced in concave portions. However, since the pressure by these forces is smaller than that in the convex portions, frictional forces between the sheet 13 and the elastic members 11 and 12 are small, and the forces to feed the sheet are therefore small. As a result, the sum total of the forces to feed the sheet function in a direction reverse to the above-described travelling direction of the flexural vibrations.

In comparison with a sheet feeding method in which a paper feeding roller is rotated by a driving force from, for example, a motor via a transmission means, such as gears and the like, the above-described sheet feeding apparatus has the excellent feature that a highly accurate sheet feeding operation can be realized without any transmission loss due to gears and the like, since the sheet is directly fed by the vibration of the elastic members. However, with such a sheet feeding apparatus, the possibility exists that the sheet is fed in an oblique direction, or moves sideways.

SUMMARY OF THE INVENTION

It is an object of the present invention to provide a sheet feeding apparatus capable of straight feeding a sheet without causing oblique or lateral movement of the sheet.

It is another object of the present invention to provide a sheet feeding apparatus utilizing travelling vibration waves, capable of straight feeding a sheet even if unevenness exists in the thickness of the sheet.

These and other objects and features of the present invention will become more apparent from the following detailed description of the invention.

DESCRIPTION OF THE PREFERRED EMBODIMENTS

Figure 1:
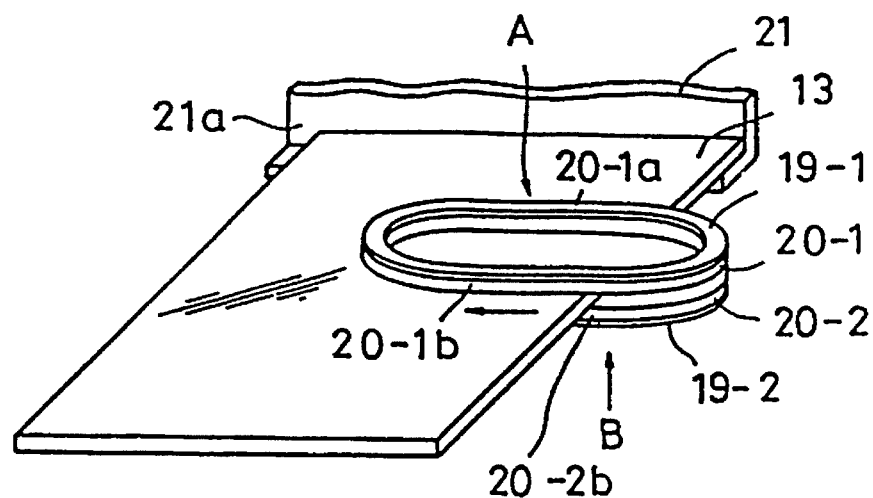
FIG. 1 is a schematic perspective view showing an embodiment of a sheet feeding apparatus according to the present invention.

FIG. 1 is a schematic perspective view showing an embodiment in which a sheet feeding apparatus according to the present invention is applied to printer.

In FIG. 1, a sheet guide 21 fixed to a case of the main body of the printer provides a guide surface 21a, which a side end of a sheet 13 contacts, along the feeding direction of the sheet.

Figure 3:
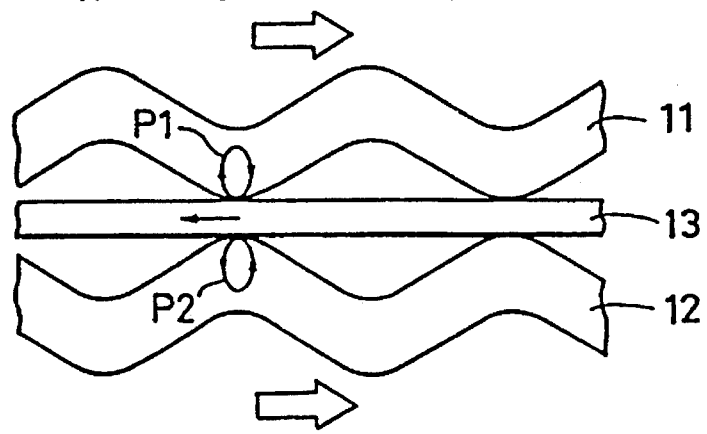
FIG. 3 is a diagram for explaining a principle for feeding a sheet.

An upper vibration member A is made of a vibrator 19-1 consisting of a piezoelectric element, serving as an electromechanical energy conversion member, fixed on the upper surface of an elastic member 20-1, such as a metallic elastic member, formed in the shape of a track having two circular-arc portions. A lower Vibration member B is made of a vibrator 19-2 consisting of a piezoelectric element made, for example, of PZT fixed on the lower surface of an elastic member 20-2, which may also be a metallic elastic member, and having the same shape as the elastic member 20-1. The two vibration members A and B are disposed facing with each other in the vertical direction so as to align respective linear portions 20-1a and 20-1b, and 20-2a and 20-2b, which will be described later, in the direction of the feeding direction of the sheet (see the arrow), and hold the sheet between them pressed against it by an energization means (not shown). If AC voltages having a phase difference between them are applied to respective vibrators 19-1 and 19-2 by known voltage supply circuits (not shown), travelling vibration waves as shown in FIG. 3 are travel in respective elastic members 20-1 and 20-2 by a known method, and the sheet 13 is thereby fed in the direction of the arrow.

Figure 2:
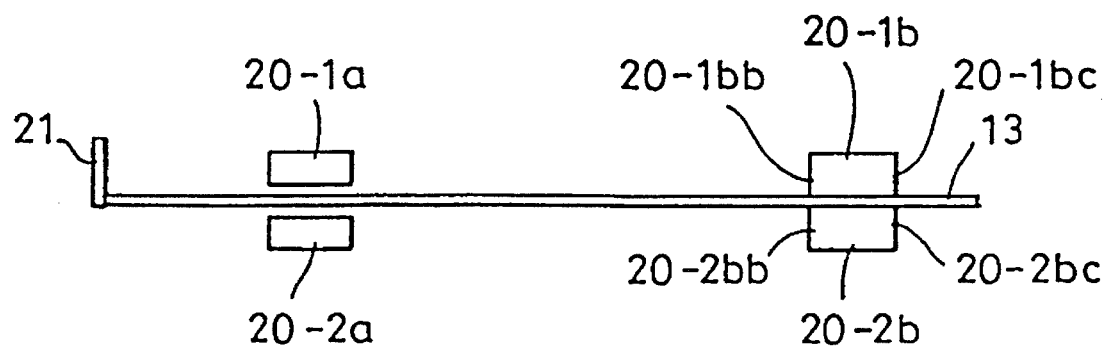
FIG. 2 is a cross-sectional view of the apparatus shown in FIG. 1.

As shown in FIG. 2, the upper and lower elastic members 20-1 and 20-2 are made so that the thickness of linear portions 20-1a and 20-2a at one side of the vibration member is smaller than the thickness of linear portions 20-1b and 20-2b at the other side. Accordingly, the sheet 13 is held and pressed by only the linear portions 20-1b and 20-2b at the other side, and is not influenced by the travelling vibration wave produced at the linear portions 20-1a and 20-2a at the one side, the direction of which is reverse to the direction of the travelling vibration wave produced at the linear portions 20-1b and 20-2b.

In each of the elastic members 20-1 and 20-2 partially having circular-arc portions as shown in FIG. 1, the amplitude of vibration of the travelling vibration wave is different between the inner circumferential sides 20-1bb and 20-2bb and the outer circumferential sides 20-1bc and 202bc. Hence, a torsion occurs in a direction perpendicular to the feeding direction of the sheet 13 (see 20-1c in FIG. 4). Consequently, the sheet 13 is fed while being pressed against the sheet guide 21.

As a result, the sheet 13 is fed without moving sideways or in an oblique direction.

Figure 4:
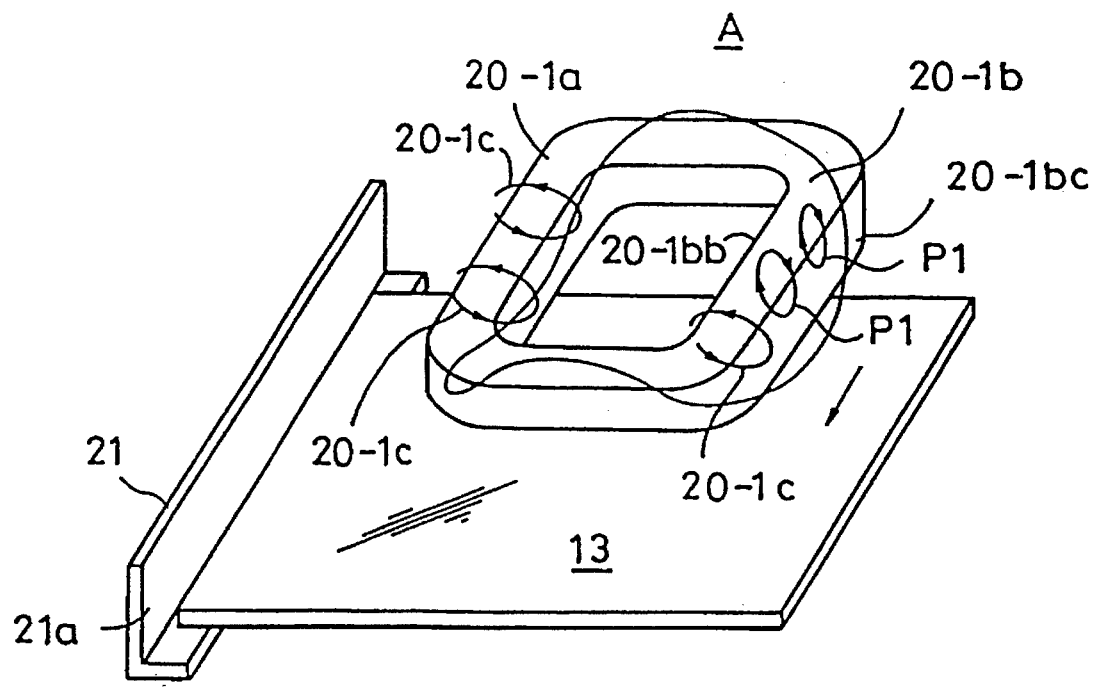
FIG. 4 is a perspective view of an embodiment in which a vibration member has the shape of a rectangular ring.
Figure 5:
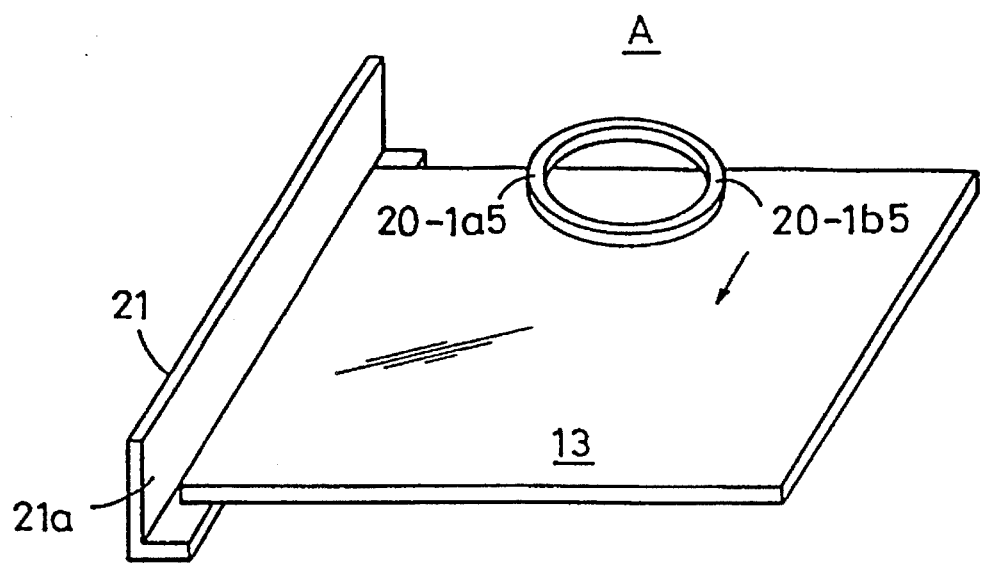
FIG. 5 is a perspective-view of an embodiment in which a vibration member has the shape of a perfect circle.

Although, in the above-described embodiment, each of the vibration members A and B has the shape of a track (an ellipse) having two circular-arc portions, it may have the shape of a rectangular ring having four circular-arc portions as shown in FIG. 4, or may have the shape of a perfect circle as shown in FIG. 5. Furthermore, the vibration member may not have the shape of a ring, but may also be a vibration member having, for example, linear portions and one circular-arc portion (not shown). In the FIG. 4 and FIG. 5 embodiments, it is of course necessary, as in the FIG. 1 embodiment, to have the configuration so that only one of the linear portions, 20-1b (FIG. 4), or one of the end portions, 20-1b5 (FIG. 5), is pressed against the sheet 13, and other portions do not contact the sheet 13.

Figure 6:
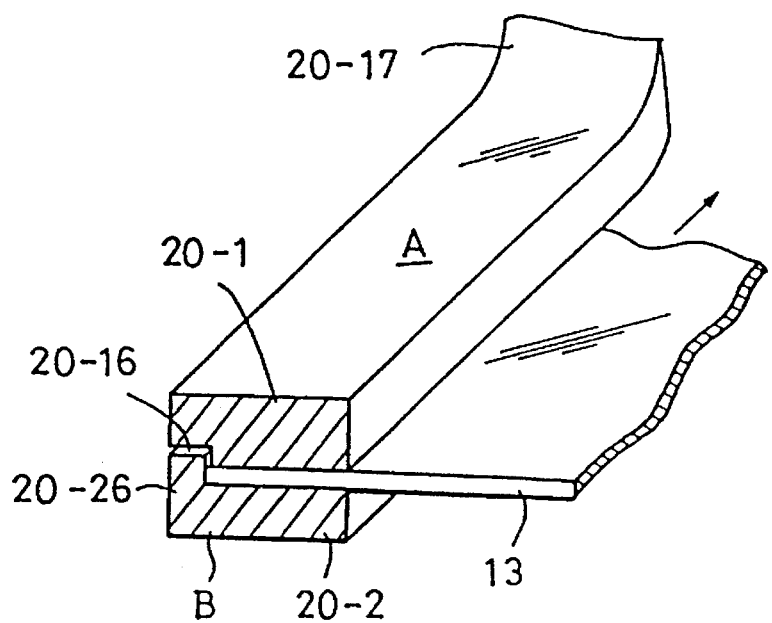
FIG. 6 is a perspective view of a principal part of an embodiment modified from the FIG. 1 embodiment.

FIG. 6 is a perspective view of a principal part of still another embodiment of the sheet feeding apparatus of the present invention applied to a printer. In FIG. 6, vibration members A and B having the shape of a track, identical to that of the vibration members A and B shown in FIG. 1, are provided facing with each other across the sheet 13 and pressed against the sheet 13 as in the FIG. 1 embodiment.

Unlike in the FIG. 1 embodiment however, in the FIG. 6 embodiment, a recess 20-16 is provided at the inner circumferential side of the vibration member A, and a protection 20-26 fitted with the recess 20-16 is also provided at the inner circumferential side of the vibration member B. The projection 20-26 and the recess 20-16 form the sheet guide 21 shown in the FIG. 1 embodiment. The sheet 13 is provided at the outer circumferential side of one of the linear portions of each of the vibration members A and B.

By applying AC signals having a phase difference therebetween to vibrators comprising phase-A and phase-B piezoelectric elements, the travelling vibration waves are produced in the vibration men, bets A and B, as in the FIG. 1 embodiment. Hence, the sheet 13 is fed along the outer circumference of the linear portion of each of the vibration members A and B.

In this embodiment, since the sheet guide is formed by respective parts of the vibration members A and B, it is possible to provide a sheet feeding apparatus with a low cost.

As described above, in the present invention, since a sheet is fed while pressing it against a sheet guide utilizing a distortion due to a difference between amplitudes of vibration produced at the inner cimferential side and the outer circumferential side of each of vibration members having at least one circular-arc portion, oblique movement of the sheet due to unevenness in the thickness of the sheet can be prevented.

Although the two vibration members 20-1 and 20-2 are used in all of tile above-described embodiments shown in FIGS. 1, 4, 5 arid 6, two vibration members are not always necessary , but only one vibration member may be used. In this case, it is of course desirable to provide an energization means for pressing the vibration member against the sheet.

Furthermore, in the case of the FIG. 6 embodiment, it is necessary to use the vibration member 20-2 having the recess 20-26 as the vibration member.

What is claimed is:

1. An apparatus for feeding a sheet, comprising:

(a) an annular elastic vibration member having an upper surface, a bottom surface, an inner circumferential portion, and an outer circumferential portion, the upper surface of said vibration member having a first portion in press contact with a sheet being fed and a second portion substantially out of contact with the sheet while the sheet is being fed; and (b) an electromechanical energy conversion element, provided on the bottom surface of said vibration member for generating a travelling vibration wave at least in the first portion of said vibration member in response to an applied electrical signal, said vibration wave creating a driving force for producing relative linear movement between said vibration member and a sheet in contact with the upper surface of said vibration member.

2. An apparatus for feeding a sheet, comprising:

(a) an annular elastic vibration member having an upper surface, a bottom surface, an inner circumferential portion, and an outer circumferential portion, the upper surface of said vibration member having a first portion in press contact with a sheet being fed and a second portion substantially out of contact with the sheet while the sheet is being fed; and (b) an electromechanical energy conversion element, provided on the bottom surface of said vibration member for generating a travelling vibration wave at least in the first portion of said vibration member in response to an applied electrical signal, said vibration wave creating a driving force for producing relative movement between said vibration member and a sheet in contact with the upper surface of said vibration member;

wherein said vibration member has an elliptical vibration element, and said conversion element generates a progressive vibration wave in a first direction at the first portion of the vibration member and a progressive vibration wave in a second direction different from the first direction at the second portion of the vibration member.

3. An apparatus according to claim 2, wherein said sheet is contactable with only one linear portion of said elliptical vibration element to receive the driving force from said only one linear portion.

4. An apparatus for feeding a sheet, comprising:

(a) an elastic vibration member having an upper surface, a bottom surface, an inner circumferential portion, and an outer circumferential portion, the upper surface of said vibration member having a first portion in press contact with a sheet being fed and a second portion substantially out of contact with the sheet while the sheet is being fed; and (b) an electromechanical energy conversion element, provided on said bottom surface of said vibration member, for generating a vibration wave at least in the first portion of said vibration member in response to an applied electrical signal, said vibration wave creating a driving force for producing relative linear movement between said vibration member and a sheet in contact with the upper surface of said vibration member.

5. An apparatus for feeding an object, comprising:
(a) a vibration member having a first portion in press contact with an object being fed and a second portion substantially out of contact with the object while the object is being fed, each of said first portion and said second portion facing the object while the object is being fed; and
(b) an electromechanical energy conversion member functionally attached to said vibration member so as to generate a travelling vibration wave in said vibration member, said travelling vibration wave generating a driving force at least in said first portion for producing relative linear movement between said vibration member and the object press contacted to the first portion of said vibration member.

6. An apparatus for feeding a sheet, comprising:
(a) a first annular elastic vibration member having an upper surface, a bottom surface, an inner circumferential portion, and an outer circumferential portion;
(b) a first electromechanical energy conversion member, provided on said bottom surface of said first annular elastic vibration member, for generating a first travelling vibration wave in said vibration member in response to an applied electrical signal;
(c) a second annular elastic vibration member having a bottom surface provided at a position substantially corresponding to the upper surface of said first annular elastic vibration member, an upper surface, an inner circumferential portion, and an outer circumferential portion, and being provided at a position facing said first annular elastic vibration member for contacting said first annular elastic vibration member via the sheet; and
(d) a second electromechanical energy conversion member, provided on said upper surface of said second annular elastic vibration member, for generating a second travelling vibration wave in said second annular elastic vibration member in response to an applied electrical signal, said first and second travelling vibration waves together producing a driving force to feed the sheet.

7. An apparatus to claim 6, wherein the direction of the first travelling vibration wave generated by the upper surface of a said first annular elastic vibration member and the direction of the second travelling vibration wave generated by the bottom surface of said second annular elastic vibration member are identical.

8. An apparatus according to claim 7, wherein said sheet contacts only the respective upper and bottom surfaces of said first and second annular elastic vibration members.

9. An apparatus according to claim 7, wherein said first and second annular elastic vibration members include a first and second elliptical elements respectively.

10. An apparatus according to claim 9, wherein said sheet contacts a first linear portion of the first elliptical element and a first linear portion of said second elliptical element provided at a position facing to the first linear portion of said first elliptical element.

11. An apparatus according to claim 10, wherein a second linear portion of the first elliptical element and a second linear portion of the second elliptical element each take the form of not contacting said sheet.

12. An apparatus for feeding a sheet, comprising:
(a) a first annular elastic vibration member having an upper surface, a bottom surface, an inner circumferential portion, and an outer circumferential portion, said inner circumferential portion having a recess therein;

(b) a first electromechanical energy conversion member, provided on said bottom surface of said vibration member, for generating a first travelling vibration in said vibration member in response to an applied electrical signal;
(c) a second annular elastic vibration member having a bottom surface provided at a position substantially corresponding to the upper surface of said first annular elastic vibration member, an upper surface, an inner circumferential portion, and an outer circumferential portion, and being provided at a position facing said first annular elastic vibration member, said inner circumferential portion of the second annular elastic vibration member having a projection engageable with the recess of the first annular elastic vibration member; and
(d) a second electromechanical energy conversion member, provided on said upper surface of said second annular elastic vibration member for generating a second travelling vibration wave in said second annular elastic vibration member in response to an applied electrical signal, said first and second travelling vibration waves together producing a driving force to feed the sheet.

13. An apparatus according to claim 12, further comprising means for applying AC signals to said first and second energy conversion elements having a phase difference therebetween.

14. An apparatus for feeding an object, comprising:
(a) a vibration member having a first portion in press contact with an object being fed and a second portion substantially out of contact with the object while the object is being fed, each of said first portion and said second portion facing the object while the object is being fed; and
(b) an electromechanical energy conversion member generating a first vibration wave which propagates in a first direction in said first portion and a second vibration wave which propagates in a second direction different from said first direction in said second portion.

15. An apparatus according to claim 14, wherein said second direction is opposite to said first direction.

16. An apparatus for feeding an object, comprising:
(a) a vibration member comprising a first portion press contactable with an object being fed, and a second portion substantially uncontactable with the object while the object is being fed, each of said first portion and said second portion facing the object while the object is being fed, said second portion being positioned in a different plane from said first portion; and
(b) an electromechanical energy conversion member functionally attached to said vibration member so as to generate a vibration wave in said vibration member, said vibration wave generating a driving force at least in said first portion for producing relative linear movement between said vibration member and the object press contacted to the first portion of said vibration member.

17. A vibrating device for an object feeding apparatus comprising:
a vibrating member having a first portion press contactable with an object being fed and a second portion substantially uncontactable with the object while the object is being fed, each of said first portion and said second portion facing the object while the object is being fed; and vibration generating means for generating a travelling vibration wave in said vibrating member, said travelling vibration wave generating a driving force with a predetermined direction in said first portion for producing relative linear movement between said vibrating member and the object press contacted to the first portion of said vibrating member.

18. A vibrating device according to claim 17, wherein said generating means generates a traveling vibration wave in the first portion.

19. An apparatus for feeding an object, comprising;

(a) a vibration member having a first portion press contactable with an object being fed and a second portion substantially uncontactable with the object while the object is being fed, the second portion facing the object and being positioned in a different plane from said first portion; and (b) generating means for generating a travelling vibration wave in a first direction on a contact surface of the first portion for feeding the object, and for generating a travelling vibration wave in a second direction which is different from said first direction on a surface of the second portion facing the object while the object is being fed.

* * * * *

UNITED STATES PATENT AND TRADEMARK OFFICE
CERTIFICATE OF CORRECTION

PATENT NO. : 5,499,808
DATED : March 19, 1996
INVENTOR(S) : YOSHIFUMI NISHIMOTO, ET AL.

It is certified that error appears in the above-indentified patent and that said Letters Patent is hereby corrected as shown below:

At [56] References Cited

```
"6464569   3/1989   Japan
 160532    3/1989   Japan
1122846    5/1989   Japan" should read --64-64569   3/1989   Japan
  1-60532    3/1989   Japan
  1-122846   5/1989   Japan--.
```

At Column 1

Line 3, "is of" should read --is a--.

At Column 2

Line 21, "perspective-view" should read --perspective view--.
Line 41, "Vibration" should read --vibration--.

UNITED STATES PATENT AND TRADEMARK OFFICE
CERTIFICATE OF CORRECTION

PATENT NO. : 5,499,808

DATED : March 19, 1996

INVENTOR(S) : YOSHIFUMI NISHIMOTO, ET AL.

It is certified that error appears in the above-indentified patent and that said Letters Patent is hereby corrected as shown below:

At Column 3

Line 8, "202bc." should read --20-2bc.--.
    Line 48, "men, bets" should read --members--.
    Line 59, "cimferential" should read --circumferential--.
    Line 66, "tile" should read --the--.

At Column 4

Line 1, "necessary , but" should read --necessary, but--.
    Line 6, "recess 20-26" should read --recess 20-16--.

At Column 5

Line 51, "a" should be deleted.

Signed and Sealed this

Nineteenth Day of November, 1996

Attest:

BRUCE LEHMAN

Attesting Officer       Commissioner of Patents and Trademarks